April 24, 1928.  1,667,168

J. O. REED

STEAM TURPENTINE STILL

Filed July 28, 1927   2 Sheets-Sheet 1

Inventor

April 24, 1928.  
J. O. REED  
STEAM TURPENTINE STILL  
Filed July 28, 1927
1,667,168
2 Sheets-Sheet 2
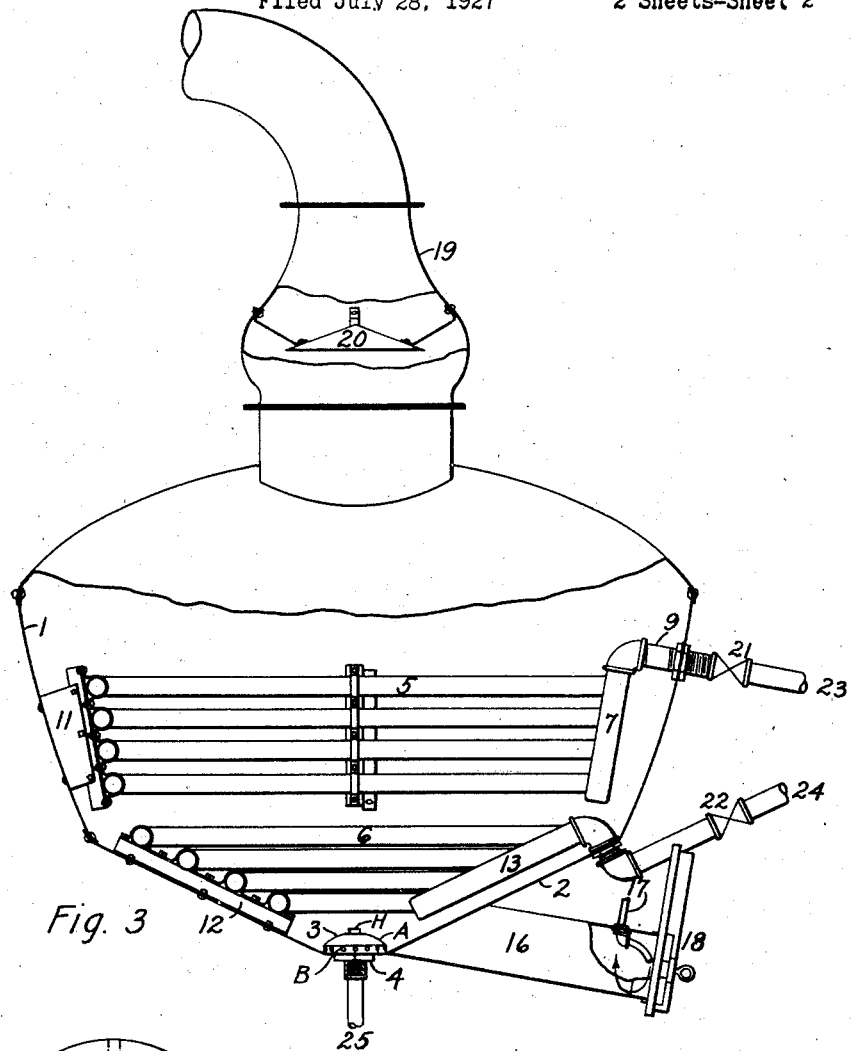
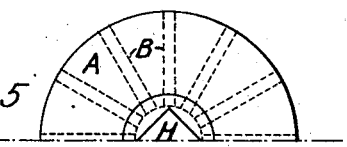
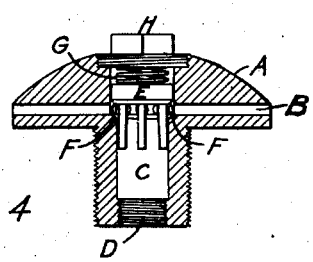

Patented Apr. 24, 1928.

1,667,168

UNITED STATES PATENT OFFICE.

JESSE O. REED, OF PAXINOS, PENNSYLVANIA, ASSIGNOR TO THE GOVERNMENT AND THE PEOPLE OF THE UNITED STATES OF AMERICA.

STEAM TURPENTINE STILL.

Application filed July 28, 1927. Serial No. 209,094.

(GRANTED UNDER THE PROVISIONS OF THE ACT OF MARCH 3, 1883, 22 STAT. L., 625.)

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to me of any royalty thereon.

This invention relates to steam stills for the distillation of crude turpentine gum and the production of rosin and spirits of turpentine, and for similar purposes.

The invention has for one of its objects the design of a steam turpentine still that will handle crude uncleaned turpentine gum or oleoresin, without requiring preheating or melting of the same. As crude turpentine gum contains an exceedingly high percentage of wood chips, bark, pine leaves, sand, etc., it has heretofore been necessary for the successful operation of a steam still to remove this refuse from the gum before distillation. In addition, because cold turpentine gum in its highly viscous state is a poor heat conducting medium, it has been necessary that the gum be made liquid by heating before being introduced in a steam still. If the gum is not pre-heated, in one section of the ordinary steam still turpentine spirits will be distilled off and rosin produced while in another section cold crude gum will remain. The steam still as described in this invention operates satisfactorily on crude uncleaned gum that has not been pre-heated. Another object of this invention is to provide turpentine distillation equipment that will produce in a more efficient manner a higher grade of rosin in less time and with lower losses than is being secured with present day fire and steam still equipment.

Another object is to provide a steam still that will utilize the present fire still equipment and method of operation to the greatest extent.

A further object of the invention is to provide a steam turpentine still that will operate on all grades of turpentine gum such as "scrape" and "cup skimmings" without any difficulties being experienced in securing an even distribution of heat in the mass during distillation and in discharging the rosin with all foreign matter remaining after distillation is complete.

Figure 1:
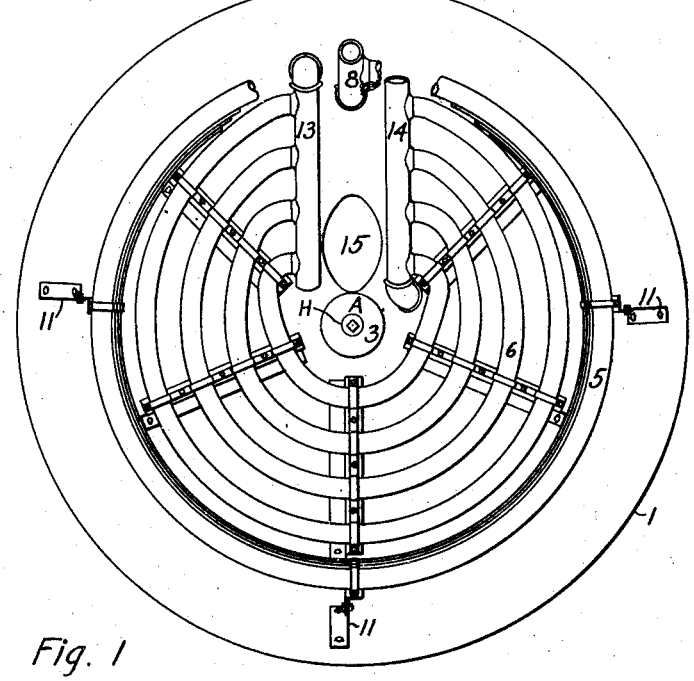
Figure 2:
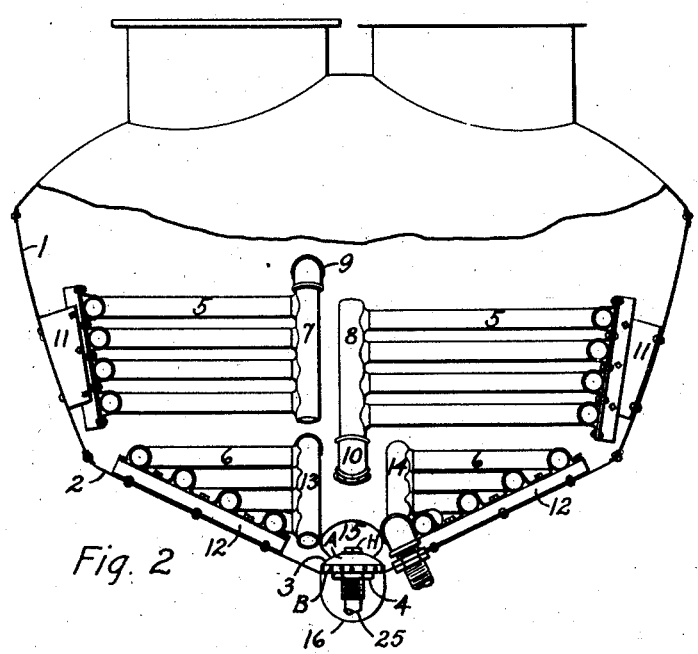

One form of my invention is illustrated in the following drawings in which Fig. 1 is a top plan view of the still with the top removed; Fig. 2 is a side elevation of the still partly in section; Fig. 3 is a side elevation of the still, partly in section, showing the cap and tail pipe; Fig. 4 is a detail view in cross section of the steam jet in the bottom of the still and Fig. 5 is a plan view of a portion of the same showing the passageways for the steam.

By reference to the drawings it will be seen that the numeral 1 designates the body portion of the still, said body being caldron shaped, its bottom 2 being in the shape of an inverted truncated cone, said conical bottom converging to the base of a live steam jet 3. This live jet 3, fixed to the bottom of the still by locknut 4, feeds live steam to the turpentine gum, said live steam being necessary to distill off the spirits of turpentine.

Additional heat for distillation is supplied by top steam coils 5 and bottom steam coils 6. Top coils 5 are spaced a sufficient distance from body 1 so as not to cause lodging of foreign matter between coils 5 and body 1. Said coils 5 are substantially parallel to one another, steam being supplied to each pipe through inlet header 7 and condensate removed by exhaust header 8, inlet header 7 entering body 1 at top and being secured to the body by steam connection 9, and exhaust header 8 having an exit in body 1 at the bottom of coils 5 and being secured to the body by pipe connection 10. Top coils 5 are held in place within body 1 by supports 11, the supports preferably being Z-shaped to allow for expansion and contraction from heat of coil pipes 5.

Bottom coils 6 rest on supports 12 preferably made Z shape, said supports 12 being riveted to conical bottom 2. Bottom coils 6 are spaced from bottom 2 in order to allow free drainage during discharge of large quantities of foreign material consisting of wood chips, etc., in gum or rosin. Each pipe coil is supplied with steam by inlet header 13 and exhausts through exhaust header 14. Inlet header 13 and exhaust header 14 are spaced sufficiently apart to allow a clearing for tail pipe or discharge pipe opening 15. Inlet header 7 and exhaust header 8 of top coils 5 are placed above headers 13 and 14 of bottom coils 6, thereby allowing satisfactory removal of foreign material in discharge of still.

Tail pipe or discharge pipe 16 is a straight pipe slightly sloping from the horizontal as shown. It is connected to still bottom 2 at opening 15 which is adjacent to live steam jet 3 and between header 13 and 14.

As the gum in the tail pipe is not cooked or distilled by the equipment in body 1 of the still a live steam connection 17 is provided near tail gate 18. This live steam connection is placed preferably at top of pipe 16 so that the rosin will drain out during discharge of still and not remain and harden in pipe causing a choking of the steam connection. Live steam connection 17 is essentially a nozzle which is preferably formed by a piece of copper tubing being shaped tangentially inside of tail pipe 16 and directed to discharge around periphery of pipe at base of tail gate 18, thereby imparting a whirling motion to the steam as it is discharged into the tail pipe and causing agitation of the gum and tends to force the gum in the tail pipe out of said pipe and into the still proper.

Live steam jet 3 is an important unit of the steam still. It is a steam jet of a special type with a built in check valve E and is used to introduce live steam during the process of distillation. Located at the base of the inverted truncated conical bottom 2 it directs the spray of steam along the conical sides of the still bottom from passageways B spaced equally along the circumference of the mushroom shaped head A. Passageways B extend to the steam supply main C which is connected to the live steam supply pipe 25 at threads D. Check valve E rests on ground seat F in steam supply opening C, said check valve E being held against seat F by spring G which rests against plug H closing steam opening C. Valve E when in contact with ground seat F closes port openings of passageways B. When steam is introduced into main C valve E is forced up from seat F and opens port openings of passageways B. When steam supply is cut off spring G forces valve E against seat F and closes port openings and passageways B. Consequently gum or rosin cannot enter the live steam supply line and clog it.

Because of the rapid rate of distillation and the large amount of agitation caused by live steam jet 3 a large amount of foreign matter is blown over with the turpentine vapors into a condenser (not shown) through still cap 19. In order to prevent this a conical shaped baffle 20 is placed opposite or near the point of maximum diameter of the still cap as shown in Figure 3. This baffle prevents the blowing of chips, bark, etc., over into the condenser with the spirits of turpentine.

The main features of the invention are as follows:

Crude gum as secured from the woods in its usual condition, mixed with wood chips, bark, sand, leaves and other impurities, is handled by the still. No cleaning, no preheating or liquefying of the gum is necessary as has been required with other steam stills. The invention permits turpentine gum to be handled as heretofore with the fire still. The skimming off of trash during the distillation process is performed more satisfactorily than with the fire still. No obstructions interfere with skimming. Because of the peculiar caldron shape of the still it is possible with the top coil 5 turned on and the bottom coil 6 turned off to produce agitation that will cause all the trash behind coils 5 and from the sides of the still to collect in the center of the still, thereby making the skimming a more simplified operation than with the old type fire still.

When the spirits of turpentine have been distilled off with the aid of the live steam jet the rosin with all the impurities can be readily and completely discharged without an objectionable quantity of residue remaining in the still. With the fire still it is necessary that the impurities be "poled" out but with a still of this type the discharge is complete.

With the features of design incorporated in this still, contrary to other types of steam stills, superheated steam or an excessively high steam pressure is not required, standard boiler pressures from 100 to 125 lbs. per square inch being entirely satisfactory. It is essential, however, for most satisfactory operation, that the steam be dry or contain practically no entrained moisture. The inverted truncated conical bottom, with the coils at a satisfactory distance from the bottom, permits complete discharge of all impurities with the rosin. The use of headers for supplying and draining the steam coils makes it possible for the still to cook the gum in a highly desirable manner. Experiments have shown that a steam coil cooks turpentine gum to rosin only ½" below the bottom of the coil. For this reason it has been impossible to distill all the gum in a still into rosin unless the coils were placed close together and rested on the bottom of the still. Because of the poor drainage that would result in the discharge of the still this means of installation has been impossible. The steam jacketed bottom can be used but with the pressures required the installation would be very expensive and would not provide sufficient heating surface to be practical. Because of the conical shape of the bottom and the corresponding shape of the coils each coil cooks the gum below the level of the coil above it. In this manner all of the gum below the level of each pipe coil and between the bottom of coil 6 and conical bottom 2 of the still is cooked to rosin. It will be noted that whatever gum remains below the level of the smallest pipe coil in the bottom of the still is handled by steam jet 3 which also agitates the gum in the base of the still by spraying steam and causing circulation underneath coil 6.

Headers 7, 8, 13 and 14 are used for supplying steam and discharging the condensate from the coils instead of using a single pipe coil or "worm." In the operation of a single coil or "worm" the condensed steam collects on the bottom of the coil and reduces the effective heat transmitting surface, especially of the bottom coil where heat is required to the greatest extent. The headers permit short lengths of pipe coil and allow the bottom coil to handle steam having the same heat capacity as the upper coils. The drainage of condensed steam from coils of this type is rapid and uniform. In addition, in the case of the bottom coil 6 headers 13 and 14 form an unobstructed discharge opening while permitting heating coils to be placed on or below the level of the tail pipe opening 15.

Steam jet 3 in being placed in the center of the still bottom permits a forced agitation of material underneath coil 6 and also allows no point for gum to remain uncooked below the bottom coil pipe of coil 6. Tail pipe 16 leads off from the conical sides of the bottom, allowing the placing of steam jet 3 in the center. The still discharges in the same manner as the present type fire still with the tail or discharge pipe having no bends or curves to become obstructed by refuse.

While in the specific embodiment of my invention above set forth I have described and also in the drawing have shown the still as comprising two separate and distinct sets of steam coils, it will be obvious that in one modification of the apparatus, a single set of steam coils in place of two separate sets of coils may be used if desired without departing from the spirit of my invention. It will be obvious that my still may be satisfactorily operated when a single set of steam coils is employed, such changes as may be necessary in the arrangement of the single coil in the still and its connecting headers and pipes for the supply and discharge of steam and condensate being simply and easily effected. However, as previously stated, I desire to use two separate sets of steam coils with headers and other equipment as above described for the reasons that I am thereby enabled to obtain more perfect control of the cooking operation of the gum, ease of installation, and greater permanence of construction, account being taken of the expansion and contraction of the coils resulting from the employment of high temperatures, as well as for the reasons heretofore set forth.

While I have described my invention as taking a particular form, it will be understood that the various parts of my invention may be changed without departing from the spirit thereof, and hence, I do not limit myself to the precise construction set forth but consider that I am at liberty to make such changes and alterations as fairly come within the scope of the appended claims.

The steam supply for coils 5 and 6 is controlled by valves 21 and 22 in pipes 23 and 24 connecting with inlet headers 7 and 13.

I claim:

1. In a turpentine still, a jet for introducing steam into the bottom of said still, said jet comprising a head having a plurality of radial passageways communicating with a vertical central passageway, a valve in said head between said radial passageways and said central passageway, a steam supply pipe communicating with said central passageway, said valve so arranged as to be operable by pressure in the said steam line to permit communication between said central and said radial passageways.

2. In a turpentine still, a jet for introducing steam into the bottom of said still, said jet comprising a head having a plurality of lateral passageways communicating with a vertical central passageway, a valve in said head between said lateral passageways and said central passageway, a steam supply pipe communicating with said central passageway, said valve so arranged as to be operable by pressure in the said steam line to permit communication between said central and said lateral passageways.

JESSE O. REED.